United States Patent [19]

Britner et al.

[11] 4,313,430

[45] Feb. 2, 1982

[54] SOLAR ENERGY ABSORBING-HEAT EXCHANGER DEVICE

[75] Inventors: George F. Britner, Old Greenwich, Conn.; John A. Zivic, Santa Ana, Calif.

[73] Assignee: Phelps Dodge Industries, Inc., New York, N.Y.

[21] Appl. No.: 79,165

[22] Filed: Sep. 26, 1979

[51] Int. Cl.³ .................................................. F24J 3/02
[52] U.S. Cl. .................................... 126/446; 165/171; 165/183; 29/157.3 C
[58] Field of Search ............... 126/445, 446, 447, 448; 165/171, 170, 183; 29/157.3 C, 157.3 D, 521; 113/118 A, 118 C, 118 D, 1 N

[56] References Cited

U.S. PATENT DOCUMENTS 4,158,908 6/1979 Block et al. .......................... 165/171
4,160,476 7/1979 Ashton ................................ 165/171

FOREIGN PATENT DOCUMENTS 635778 4/1950 United Kingdom ................ 165/170

Primary Examiner—James C. Yeung
Attorney, Agent, or Firm—Davis, Hoxie, Faithfull & Hapgood

[57] ABSTRACT

A solar energy absorbing-heat exchanger device includes a copper tube and first and second identical copper sheets, the two sheets having semi-cylindrical curved surfaces which together fully enclose the tube and the sheets otherwise being essentially flat. Each sheet is joined to the other directly adjacent to and on opposite sides of the tube by two roll-formed seams. The roll-formed seams hold the sheets about the tube in tension to maintain contact between the tube surface and curved surfaces of the sheets. The semi-cylindrical curved surfaces may be roll-formed, as may be narrow channels and angular turns in each sheet which, when interengaged, are roll-formed toward the enclosed tube to form the two seams. The seams may include the use of solder, stiffener grooves may be added to the flat parts of the copper sheets, and channels may be added at the ends of the sheets remote from the enclosed tube to connect a number of such devices together. The roll-forming of the sheets may be carried out by a continuous, high-speed process.

7 Claims, 3 Drawing Figures

SOLAR ENERGY ABSORBING-HEAT EXCHANGER DEVICE

BACKGROUND OF THE INVENTION

This invention relates to a solar energy absorbing-heat exchanger device of the type having metal sheets of heat absorbing material such as copper, the sheets being in heat exchanging relationship with conduits through which a liquid or gas passes. The metal sheets may be heated by exposure to the sun's energy, the heat being conducted to the conduits which in turn pass the heat to the liquid or gas. It is desirable to design such a device to utilize parts that can be easily and economically manufactured and assembled to provide reliability, durability, and maximum thermal conductivity between the sheets and the conduit.

Prior art designs have had various deficiencies, some of which include the use of non-conventional conduit designs which provide difficulties in connecting to headers; the use of thicker and thus more expensive sheets in those instances where the conduit is formed directly from the sheet and thus requires sufficient thickness to contain required fluid pressure in the conduit; and, the use of non-identical sheets in certain designs, thus decreasing manufacturing efficiency and convenience. Further, certain designs with discrete tube conduits and sheets present problems of interconnection, and either do not fully enclose the tube to achieve reliable, durable and maximum tube to sheet contact or do not adequately lock fully enclosing sheets in tension about the tube to achieve maximum tube to sheet contact and thus maximum thermal conductivity. Certain prior art designs also do not lend themselves to a continuous, high-speed forming and assembly of the device.

SUMMARY OF THE INVENTION

The present invention consists of a solar energy absorbing-heat exchanger device including first and second copper sheets having curved portions which together fully enclose a copper tube. The two copper sheets are joined to each other to fully enclose the tube by roll-formed seams directly adjacent, and spaced around the circumference of, the tube. One seam is formed of an end of the first sheet folded back upon itself to capture an intermediate fold of the second sheet, and the other seam is formed of an end of the second sheet folded back upon itself to capture an intermediate fold of the first sheet. The remainder of the two sheets outside the region of the enclosed tube are essentially flat, with optional shallow stiffener grooves and end channels to mate with corresponding sheets of other such devices for connection of a multiplicity of such devices. The curved portions, as well as interfitting narrow channels and angular turns, are roll-formed in each sheet before the two seams are roll-formed. As is well-known, roll-forming generally is the process of passing metal sheets through mating roller dies to be formed into desired configurations, the process providing close tolerances and fits.

The present invention allows conventional copper tubes to be utilized, which thus can be easily joined to headers. The copper sheets can be thin relative to the tube wall thickness, since the tube rather than a formed part of the sheets defines the conduit. In this manner, copper is conserved to reduce the device cost. Further, the sheets can be produced by a continuous high-speed process in a variety of lengths, widths, and tube size accommodation and spacing without incurring large re-tooling costs.

A further advantage of the present invention is that the sheets completely surround the tube, to enable a larger, more reliable, more effective, and durable metal-to-metal contact. In addition, the spaced and generally diametrically opposite roll-formed seams provide sufficient mechanical strength to pre-stress the wraparound curved portions of the sheets to maintain a sufficient metal-to-metal contact for maximum thermal conductivity. Solder or other materials may optionally be added to fill any remaining voids in the roll-formed seams if desired, to further assure mechanical closure and to provide some thermal contact in such void area.

DESCRIPTION OF EMBODIMENT

Figure 1:
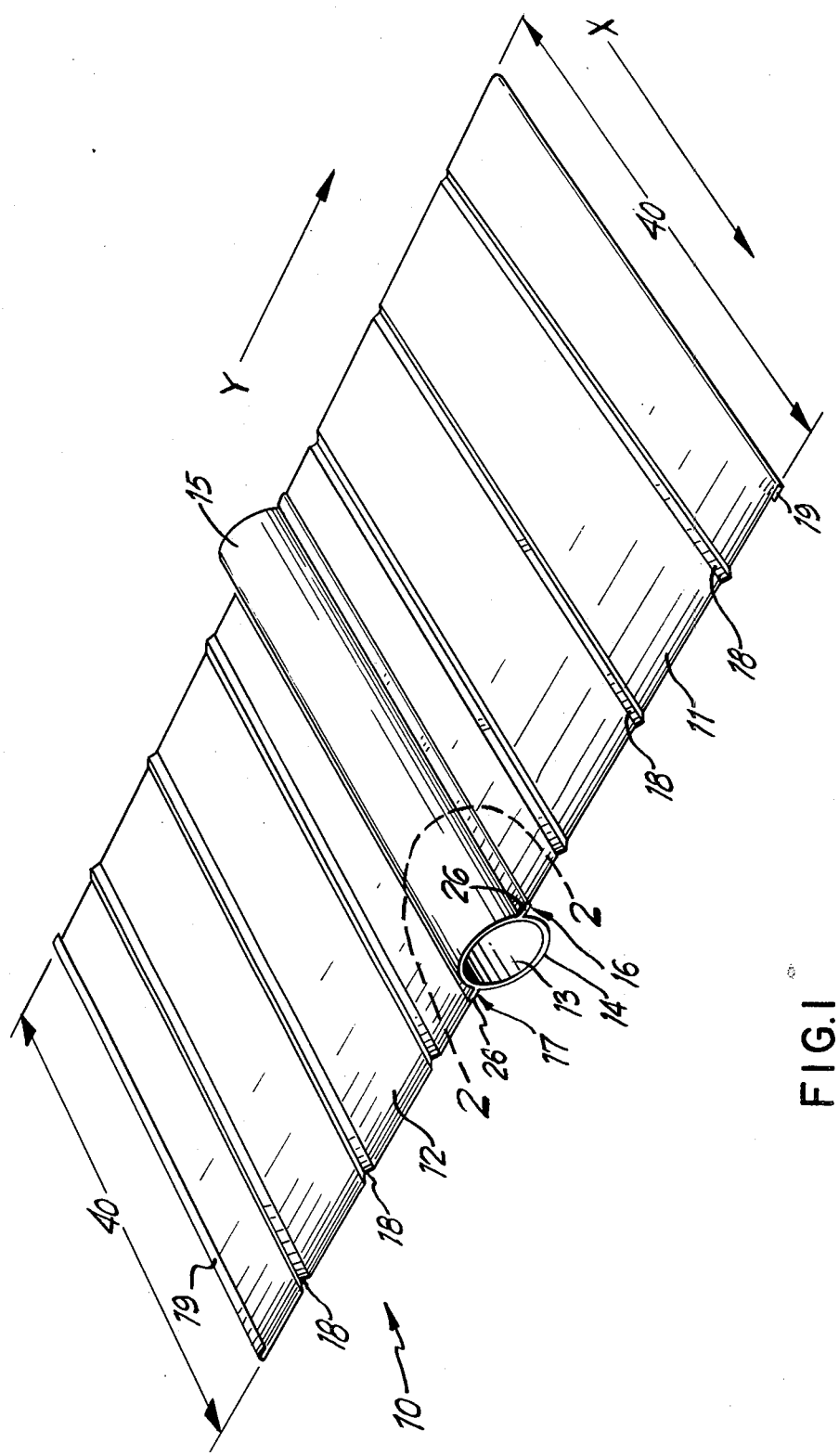
FIG. 1 is a view in perspective of an assembled solar energy absorbing-heat exchanger device according to the present invention.
Figure 2:
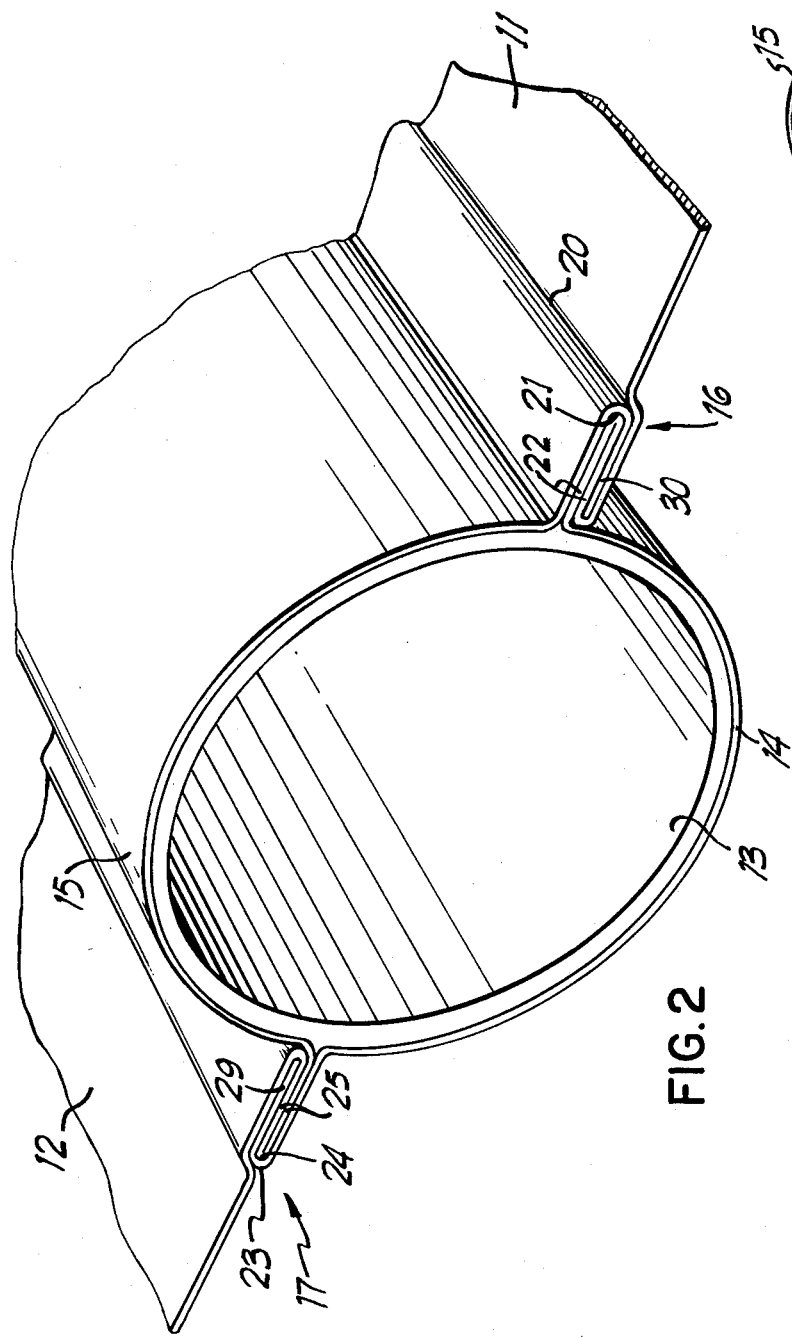
FIG. 2 is an enlarged partial view of that portion of FIG. 1 within lines 2—2, illustrating in detail the two roll-formed seams utilized in the assembly of the copper tube and solar energy absorbing sheets of the present invention.

Referring now to FIGS. 1 and 2 of the drawings, the assembled solar energy absorbing-heat exchanger device 10 of the present invention includes two thin copper sheets 11 and 12 and a conventional copper tube 13. The ends of the tube may be connected in known fashion to headers, not shown. Sheet 11 has curved portion 14 extending around and contacting a semi-cylindrical portion of tube 13, and sheet 12 has a curved portion 15 extending around and contacting the remaining semi-cylindrical portion of tube 13. The two copper sheets 11 and 12 are joined to each other to fully enclose tube 13 by roll-formed seams 16 and 17 directly adjacent and parallel to the tube 13, and diametrically opposite one another across the tube. It will be appreciated that one of the two curved portions 14, 15 may occupy a greater portion of the circumference of tube 13, while the other curved portion may occupy a lesser portion of the circumference of tube 13. It is preferred, however, that each curved portion 14, 15 be semi-cylindrical so that sheets 11 and 12 may be manufactured and formed identical to one another for convenience and economy.

Copper sheets 11 and 12 are essentially flat outside the region of enclosed tube 13 to gather the energy of the sun in known fashion. The surfaces of the sheets to face the sun may be provided with absorptive coatings in known fashion to more efficiently collect solar energy. Shallow stiffener grooves 18 may be roll-formed in each sheet 11, 12 to provide rigidity. The ends of each sheet remote from enclosed tube 13 are formed with channels or grooves 19 to permit interlocking connection with corresponding channels or grooves in copper sheets of corresponding solar energy absorbing-heat exchanger devices 10. In this manner, a number of such units 10 may be connected in a line to achieve sufficient gathering of solar energy. Tube 13 may carry a fluid or a gas to be heated by the solar energy received by copper sheets 11, 12 and efficiently transferred to tube 13 by virtue of the construction of the present invention.

Referring now to FIG. 2, roll-formed seams 16 and 17 are shown in detail. At seam 16, the end 20 of sheet 12 is folded back upon itself to form channel 21. An intermediate folded portion 22 of sheet 11 is in turn tightly secured within channel 21 to complete seam 16. Correspondingly, at seam 17, sheet 11 has its end 23 folded back upon itself to form channel 24, and an intermediate portion 25 of sheet 12 is tightly secured within channel 24 to complete seam 17. It will be noted that an end 20 of sheet 12 is located at one seam 16 of the two seams 16, 17, whereas an end 23 of sheet 11 is located at the other seam 17 of the two seams 16, 17. The diametrically opposed seams 16, 17 are formed, as will be evident from the description below, so as to hold the curved portions 14, 15 of sheets 11, 12 in tension about tube 13. Curved portions 14, 15 thereby tightly and fully enclose tube 13 to provide a reliable and durable surface contact therebetween for maximum heat transfer between copper sheets 11, 12 and tube 13. If desired, solder 26 also may be added within the voids of seams 16, 17 to assist in the locking action at the seams and to provide a seal. The solder in the voids does not interpose any path of thermal resistance.

Figure 3:
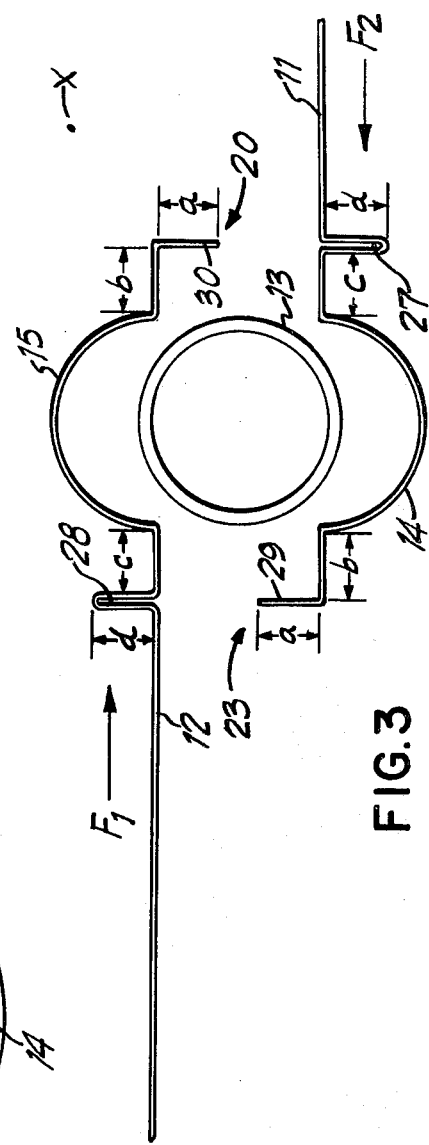
FIG. 3 is a side elevational view of the disassembled tube and sheets of the present invention, illustrating the manner in which they are formed and assembled.

Disassembled sheets 11, 12 and tube 13 are shown in FIG. 3, illustrating the manner of assembly of solar energy absorbing-heat exchanger device 10 of the present invention. Sheets 11 and 12 have curved portions 14 and 15 formed therein adjacent ends or end positions 23 and 20 by conventional roll-forming technique. Each curved portion 14 and 15 is semi-cylindrical as shown, and with a sufficient radius of curvature such that tube 13 is fully enclosed when curved portions 14 and 15 are displaced toward each other and brought together about tube 13. Sheet 11 has narrow upstanding channel 27 adjacent to and extending to the same side of the sheet as curved portion 14, and sheet 12 has narrow upstanding channel 28 adjacent to and extending to the same side of the sheet as curved portion 15, both channels 27 and 28 being formed by conventional roll-forming technique. Ends 23 and 20 of sheets 11 and 12 have, respectively, angular turns 29 and 30 formed by conventional roll-forming technique, the angular turns 29 and 30 extending to the sides of their respective sheets 11, 12 in directions opposite respectively to curved portions 14, 15.

It now can be seen from FIG. 3 that the device 10 is assembled by bringing sheets 11 and 12 together so that curved portions 14, 15 surround and enclose tube 13, angular turn 29 of sheet 11 fits within channel 28 of sheet 12, and angular turn 30 of sheet 12 fits within channel 27 of sheet 11. The tightly locked and full enclosure of the tube is then completed by roll-forming both the interengaged channel 28 and angular turn 29, and the interengaged channel 27 and angular turn 30, toward enclosed tube 13. Force arrows $F_1$ and $F_2$ illustrate the direction of this action, and result in the tightly locked roll-formed seams 16 and 17 shown in FIGS. 1 and 2.

As means to assure the accurate and tight assembly of the present invention by identical sheets 11 and 12 about tube 13, the dimensions a,b,c,d, shown in FIG. 3 for sheet 11 are all identical to each other and further are identical to the corresponding dimensions a,b,c,d for sheet 12. Dimension a is the length of angular turns 29 and 30, dimension b is the distance dimension of each angular turn from the adjacent curved portions 14 and 15 respectively, dimension c is the distance dimension of each narrow channel 27 and 28 from the adjacent curved portions 14 and 15 respectively, and dimension d is the depth dimension of each narrow channel 27 and 28.

As previously noted, the roll-formed seams 16, 17 may be soldered, shallow stiffener grooves 18 may be roll-formed in sheets 11 and 12, and the ends of each sheet remote from enclosed tube 13 may have roll-formed channels or grooves 19 for interconnecting with other devices 10 to connect together a multiplicity of such devices.

In a preferred method of continuously roll-forming and assembling the present invention, a sheet such as 11 with its geometric configuration of FIG. 3 is formed from a large coil of flat copper strip that is mounted on a pay-off reel. The flat copper strip is continuously run along its length through a conventional roll-former in the direction shown as arrow X in FIG. 1 (perpendicular to the plane of the drawing of FIG. 3), to continuously roll-form a curved portion such as 14, a channel such as 27, and an angular turn such as 29, along the length of the copper strip as the strip is drawn off the reel and through the roll-former. Equal predetermined lengths 40 (FIG. 1) of the roll-formed strip are continuously cut as by a flying shear at the exit end of the roll-former to form individual and identical sheets such as 11 and 12. A roll-formed sheet such as sheet 11 of predetermined length 40 is then placed in the in-feed rack of another conventional roll-former, and a tube 13 of predetermined length is placed in curved portion 14 of sheet 11. The tube will generally be slightly longer than length 40 for the attachment to conventional headers. An identical roll-formed sheet such as sheet 12, also cut from the copper strip and having the same predetermined length 40, is inverted and placed on top of tube 13 such that the respective channels 27, 28 and angular turns 30, 29 mate. The mated sheets 11, 12 and enclosed tube 13 then move through a roll-former to generate roll-formed seams 16, 17 as described above. The headers are then added.

It will be understood from the above description of the present invention that it also is possible to roll-form and assemble the device of the present invention from pre-cut flat individual sheets 11 and 12, which are then individually roll-formed and assembled rather than having their geometric configuration continuously roll-formed from a strip as described above.

It further is possible to form numerous curved portions such as 14, 15 and numerous upstanding narrow channels such as 27, 28 in a copper strip continuous in the direction Y of FIG. 1, the curved portions and narrow channels extending when initially formed from the same side of the continuous copper strip and at the desired spacings, followed by cutting the continuous sheet at the end positions adjacent the curved portions to form numerous individual sheets such as 11, 12. Angular turns such as 29, 30 may be formed in the individual sheets after cutting, followed by assembly about tubes such as 13 to form devices 10 in the same manner as described above.

The present invention has been described in the form of a solar energy absorber, which may be used to heat water or other heat transfer fluids for use in both heating and cooling systems. It will be appreciated, however, that the present invention also may be used generally as a heat exchanger (i.e., as a radiator, to cool water or other fluids, etc.). Further, while copper is described as the material from which the invention is formed, other materials such as aluminum or steel for example may be used as alternatives for the sheets and/or tubes. In addition, in certain low-pressure applications of the present invention, it is possible that a length of each tube may be removed for a saving in material. It should be understood that these and other modifications of the present invention may be made without departing from the spirit and scope of the invention as hereinafter claimed.

What is claimed is:

1. A solar energy absorbing-heat exchanger device, comprising in combination: a metal tube; first and second thin metal sheet members; each metal sheet having an essentially flat portion for heat transfer outside the location of the tube; one of said metal sheets having a curved portion extending around and in contact with a portion of the circumferential surface of the tube and the other of said metal sheets having a curved portion extending around and in contact with the remainder of the circumferential surface of the tube, the curved portions of the two metal sheets thereby jointly fully enclosing the metal tube; the two metal sheets being joined to each other to fully enclose the tube by two roll-formed seams adjacent the tube and spaced from each other around the circumference of the tube at the two positions where the curved portion of one of the two sheets meets the curved portion of the other sheet; each roll-formed seam including a folded portion of each sheet, the essentially flat portion of the first sheet member extending outwardly from one seam and the essentially flat portion of the second sheet member extending outwardly from the other seam; each of the two seams extending parallel to the tube and being comprised of an end of one of the sheet members being folded back upon itself to form a channel within which a folded intermediate portion of the other sheet member is tightly secured; and, the first sheet member having its folded end at one of the two seams and securing the folded intermediate portion of the second sheet member, the second sheet member having its folded end at the other of the two seams and securing the folded intermediate portion of the first sheet member.

2. The invention defined in claim 1, wherein the two roll-formed seams are formed on opposite sides of each metal sheet.

3. The invention defined in claim 1, wherein the two sheet members are essentially identical to each other.

4. The invention defined in claim 1, wherein the curved portions of the two sheets enclosing the tube are held in tension by the two seams to maintain overall contact between the surface of the curved portions and the surface of the tube.

5. The invention defined in claim 1, wherein the curved portions of the two sheets each extend around essentially one-half the circumference of the tube, and the two seams are essentially diametrically opposite each other in relation to the tube.

6. The invention defined in claim 1, wherein each seam includes solder locking means.

7. The invention defined in claim 4, wherein the metal tube and metal sheet members are comprised of copper.

* * * * *

UNITED STATES PATENT AND TRADEMARK OFFICE
CERTIFICATE OF CORRECTION

PATENT NO. : 4,313,430

DATED : February 2, 1982

INVENTOR(S) : George F. Britner, John A. Zivic

It is certified that error appears in the above—identified patent and that said Letters Patent is hereby corrected as shown below:

ON THE TITLE PAGE:

After the identification of inventors

"[75] Inventors: George F. Britner, Old Greenwich, Conn.; John A. Zivic, Santa Ana, Calif.", add --; Phillips V. Bradford, Princeton, New Jersey--.

Signed and Sealed this

Eleventh Day of May 1982

[SEAL]

Attest:

Attesting Officer

GERALD J. MOSSINGHOFF

Commissioner of Patents and Trademarks